United States Patent
Koyama et al.

(10) Patent No.: US 8,677,828 B2
(45) Date of Patent: Mar. 25, 2014

(54) VIBRATION DETECTING DEVICE

(75) Inventors: Mitsuaki Koyama, Sayama (JP); Takeru Mutoh, Sayama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 269 days.

(21) Appl. No.: 13/374,627

(22) Filed: Jan. 3, 2012

(65) Prior Publication Data

US 2012/0186351 A1   Jul. 26, 2012

(30) Foreign Application Priority Data

Jan. 25, 2011  (JP) .................................. 2011-013106
Sep. 30, 2011  (JP) .................................. 2011-216171

(51) Int. Cl.
 *G01H 11/06* (2006.01)
(52) U.S. Cl.
 USPC ............................................. 73/651; 73/579
(58) Field of Classification Search
 USPC .................................... 73/651, 579, 649, 652
 See application file for complete search history.

(56) References Cited

U.S. PATENT DOCUMENTS

| | | | | |
|---|---|---|---|---|
| 4,004,166 A | * | 1/1977 | Nakata | 310/312 |
| 4,788,466 A | * | 11/1988 | Paul et al. | 310/323.06 |
| 5,455,475 A | * | 10/1995 | Josse et al. | 310/316.01 |
| 5,734,098 A | * | 3/1998 | Kraus et al. | 73/61.62 |
| 5,987,987 A | * | 11/1999 | Watarai | 73/504.16 |
| 7,589,458 B2 | * | 9/2009 | Aratake | 310/370 |

FOREIGN PATENT DOCUMENTS

JP       7-131279         5/1995

* cited by examiner

*Primary Examiner* — J M Saint Surin
(74) *Attorney, Agent, or Firm* — Jordan and Hamburg LLP (57) ABSTRACT

Provided is a device capable of easily and accurately detecting a vibration period when, for example, an earthquake occurs. When a quartz-crystal plate bends upon application of a force, capacitance between a movable electrode provided at its tip portion and a fixed electrode provided on a vessel to face the movable electrode changes, so that an oscillation frequency of the quartz-crystal plate changes according to this capacitance. Therefore, when the vessel is vibrated, there appear a first state where the quartz-crystal plate ends to approach the fixed electrode and a second state where the quartz-crystal plate is in an original state or bends to be apart from the fixed electrode. Accordingly, an oscillation frequency corresponding to the first state and corresponding to the second state alternately appear, and therefore, it is possible to find the period (frequency) of the vibration.

6 Claims, 8 Drawing Sheets

VIBRATION DETECTING DEVICE

BACKGROUND OF THE INVENTION

1. Field of the Invention

The present invention relates to a technical field for detecting a vibration period by using a quartz-crystal resonator.

2. Description of the Related Art

There sometimes arises a need for detecting a period (frequency) of vibration applied to an object. For example, quick warning is necessary, for example, when an earthquake occurs. When the scale of the earthquake is large, its vibration frequency is about 0.01 Hz to about 30 Hz and is lower than vibration caused by daily life vibration, and therefore, if its vibration frequency can be detected, it is possible to discriminate the earthquake from the daily life vibration. However, detecting such a low frequency is difficult.

An object of the formation of capacitance in Patent Document 1 is to stabilize an oscillation frequency of a quartz-crystal resonator and is different from an object of the present invention.

Patent Document 1: Japanese Patent Application Laid-open No. Hei 07-131279

SUMMARY OF THE INVENTION

The present invention was made under such circumstances and has an object to provide a device capable of easily and accurately detecting a vibration period (vibration frequency).

The present invention is a device detecting a period of vibration of an object and an external force, including:

a piezoelectric plate;

a first excitation electrode and a second excitation electrode provided on one surface and another surface of the piezoelectric plate respectively to vibrate the piezoelectric plate;

an oscillator circuit electrically connected to the first excitation electrode;

a plate-shaped member provided in a vessel and having one end supported in a cantilever manner;

a movable electrode for variable capacitance formation provided at another end of the plate-shaped member and electrically connected to the second excitation electrode;

a fixed electrode provided in the vessel to face the movable electrode, connected to the oscillator circuit, and forming variable capacitance when capacitance between the fixed electrode and the movable electrode is varied due to bending of the plate-shaped member; and a frequency information detecting part detecting a signal being frequency information corresponding to an oscillation frequency of the oscillator circuit, wherein an oscillation loop is formed from the oscillator circuit back to the oscillator circuit through the first excitation electrode, the second excitation electrode, the movable electrode, and the fixed electrode, and wherein vibration of the vessel produces a first state where the plate-shaped member bends toward the fixed electrode to approach the fixed electrode and a second state where the plate-shaped member is more apart from the fixed electrode than in the first state, and the frequency information is used for finding a period of the vibration by utilizing a fact that an oscillation frequency corresponding to the first state and an oscillation frequency corresponding to the second state alternately appear.

One form of this invention may be a structure where the plate-shaped member also serves as the piezoelectric plate.

Further, another form may be
a structure where, in the plate-shaped member, a portion where the movable electrode is provided is larger in thickness than a portion sandwiched by the first excitation electrode and the second excitation electrode, or a structure where, in the plate-shaped member, a portion between a portion that the first excitation electrode and the second excitation electrode sandwich and the movable electrode is smaller in thickness than the sandwiched portion.

In the present invention, the vibration of the vessel produces the first state where the quartz-crystal plate bends toward the fixed electrode to approach the fixed electrode and the second state where the quartz-crystal plate is more apart from the fixed electrode than in the first state, and the oscillation frequency corresponding to the first state and the oscillation frequency corresponding to the second state alternately appear. Therefore, it is possible to find the period (frequency) of the vibration based on a change between these oscillation frequencies.

DETAILED DESCRIPTION OF THE PREFERRED EMBODIMENTS

First Embodiment

Figure 1:
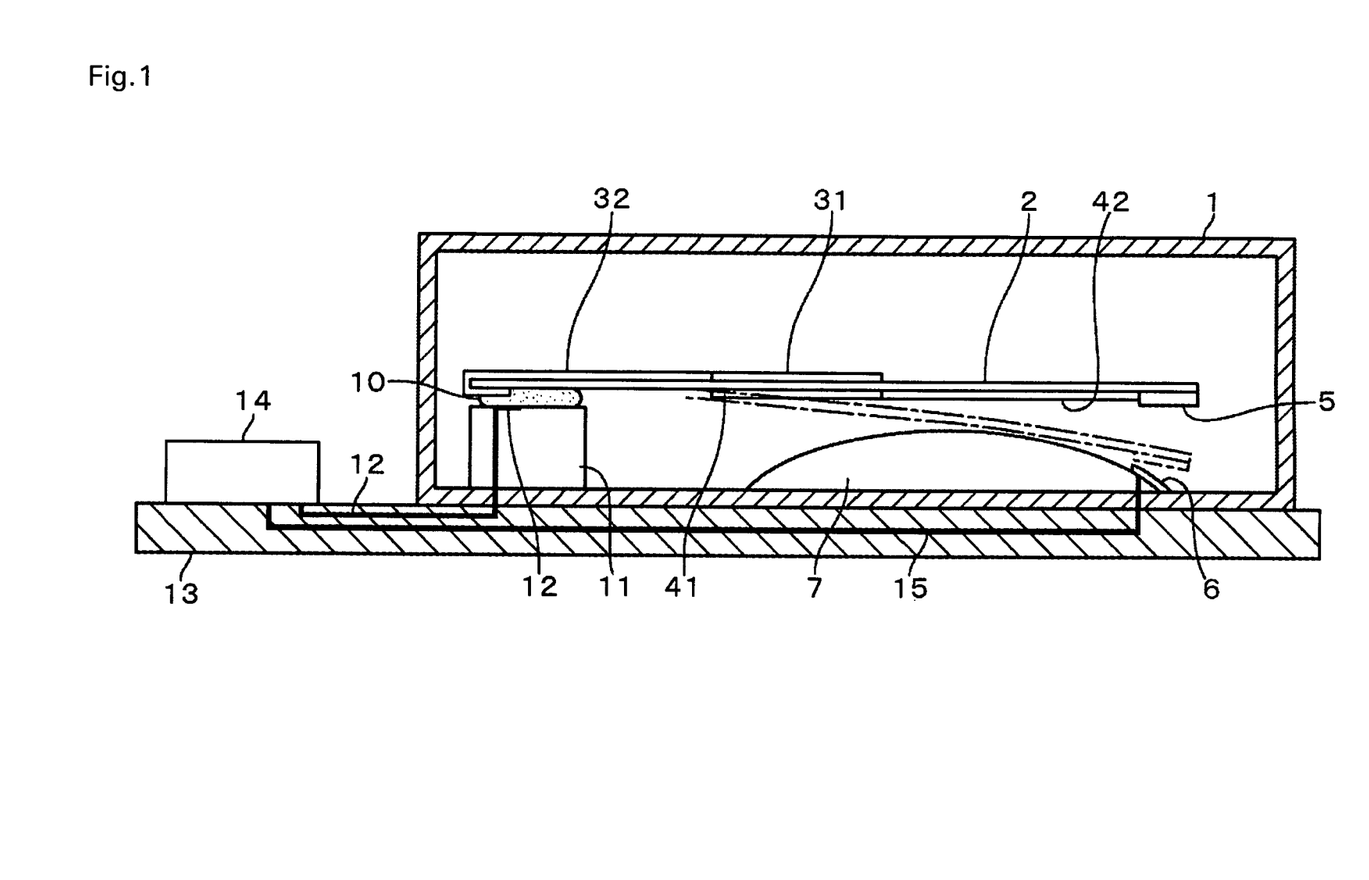
FIG. 1 is a vertical side sectional view showing a vibration detecting device according to a first embodiment of the present invention.
Figure 2:
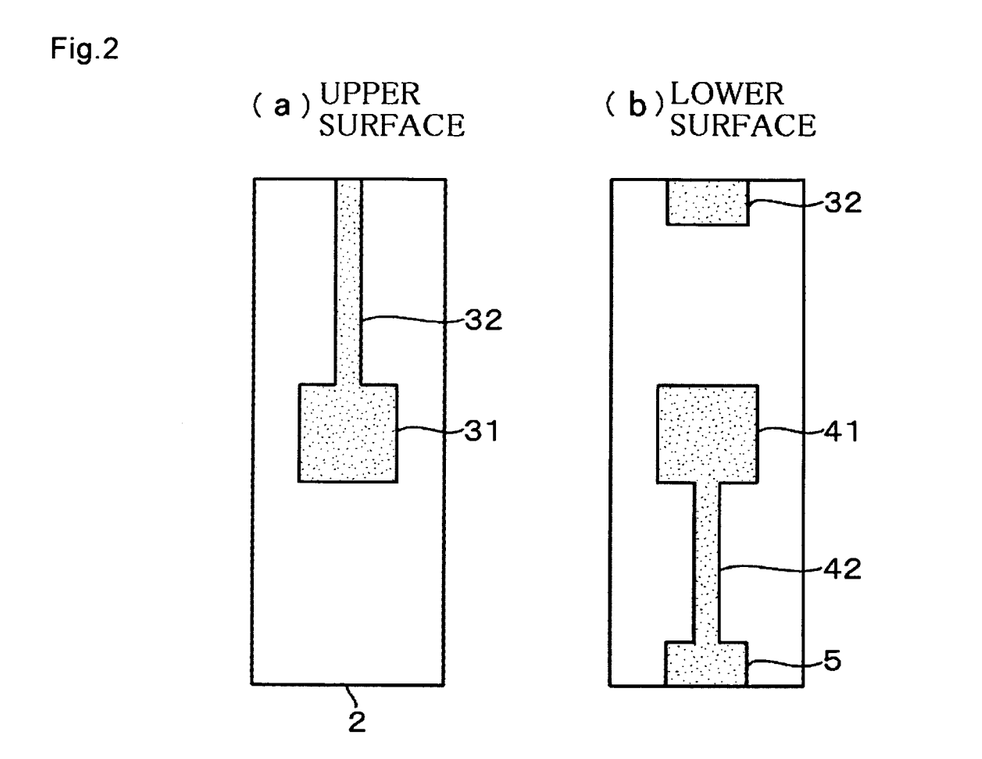
FIG. 2(a) and FIG. 2(b) are plane views showing an upper surface and a lower surface of a quartz-crystal plate according to the embodiment.

A first embodiment of the present invention will be described. In FIG. 1, 1 denotes an airtight vessel in a rectangular parallelepiped shape, which is made of quartz crystal. In a sealed space inside the vessel 1, a pedestal 11 made of quartz crystal is provided, and one end of a quartz-crystal plate 2 is fixed to an upper surface of the pedestal 11 by a conductive adhesive 10. The quartz-crystal plate 2 is formed in a strip shape from AT-cut quartz crystal, with its thickness being set to, for example, on a several ten μm order, for example, 0.03 mm. Therefore, when a force is applied to the quartz-crystal plate 2 in a direction intersecting therewith, its tip portion bends. The quartz-crystal plate 2 has an excitation electrode 31 provided at a center portion of its upper surface as shown in FIG. 2(a), and on its lower surface, it has an excitation electrode 41 at a portion facing the excitation electrode 31 as shown in FIG. 2(b). A lead electrode 32 in a band shape is connected the excitation electrode 31 on the upper surface, and at one end of the quartz-crystal plate 2, this lead electrode 32 is folded back to the lower surface to come into contact with the conductive adhesive 10. A conductive path 12 made of a metal layer is provided on the upper surface of the pedestal 11, and via an insulated substrate 13 supporting the vessel 1, the conductive path 12 is connected to one end of an oscillator circuit 14 on the insulated substrate 13.

A lead electrode 42 in a band shape is connected to the excitation electrode 41 on the lower surface, and the lead electrode 42 is led out to the other end (tip) of the quartz-crystal plate 2 to be connected to a movable electrode 5 for variable capacitance formation. On the vessel 1 side, a fixed electrode 6 for variable capacitance formation is provided. On a bottom portion of the vessel 1, a projection 7 made of quartz crystal in a convex shape (in a circular shape when seen in a plane view) is provided, and the fixed electrode 6 is provided on the projection 7 so as to substantially face the movable electrode 5. The quartz-crystal plate 2 has a property of being easily chipped in its crystal lump due to a phenomenon called "cleavage" when it vibrates excessively to have its tip collide with the bottom portion of the vessel 1. Therefore, the shape of the projection 7 is decided so that a portion, of the quartz-crystal plate 2, deviated from the movable electrode 5 toward a base end (one end) side of the quartz-crystal plate 2 collides with the projection 7 when the quartz-crystal plate 2 excessively vibrates.

Figure 3:
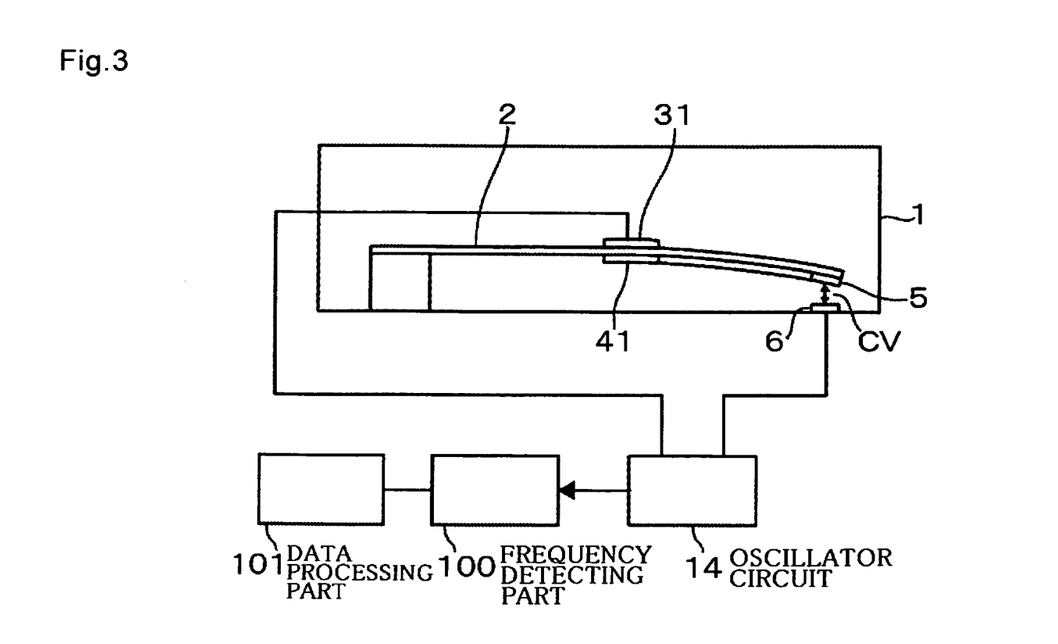
FIG. 3 is a block diagram showing a circuit configuration of the vibration detecting device.
Figure 4:
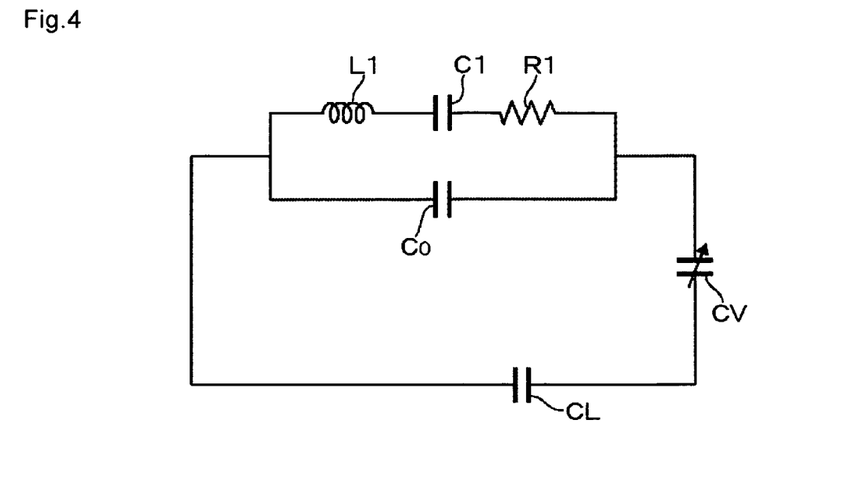
FIG. 4 is a circuit diagram showing an equivalent circuit of the vibration detecting device.

The fixed electrode 6 is connected to the other end of the oscillator circuit 14 via a conductive path 15 laid through a surface of the projection 7 and the insulated substrate 13. FIG. 3 shows a connection state of wiring of the vibration detecting device and FIG. 4 shows its equivalent circuit. Specifically, the excitation electrode 31 on the upper surface and the excitation electrode 41 on the lower surface are connected to the oscillator circuit 14, and variable capacitance Cv formed between the movable electrode 5 and the fixed electrode 6 is interposed between the excitation electrode 41 on the lower surface and the oscillator circuit 14. In FIG. 4, C0 denotes a parallel capacitance of a quartz-crystal resonator and C1 denotes a series capacitance of the quartz-crystal resonator.

At the tip portion of the quartz-crystal plate 2, a weight may be provided so that the quartz-crystal plate 2 bends by a great amount when acceleration is applied. In this case, the movable electrode 5 may also serve as the weight by having a larger thickness, the weight may be provided on the lower surface of the quartz-crystal plate 2 separately from the movable electrode 5, or the weight may be provided on the upper surface of the quartz-crystal plate 2.

Here, according to the International Standard IEC 60122-1, a quartz-crystal oscillator circuit is expressed by the following general formula (1).

$$FL = Fr \times (1+x) \quad (1)$$

$$x = (C1/2) \times 1/(C0+CL)$$

FL is an oscillation frequency when a load is applied to a quartz-crystal resonator and Fr is a resonant frequency of the quartz-crystal resonator itself.

In this embodiment, as shown in FIG. 3 and FIG. 4, load capacitance of the quartz-crystal plate 2 is the sum of CL and Cv. Therefore, y expressed by the formula (2) is substituted in place of CL in the formula (1).

$$y = 1/(1/Cv + 1/CL) \quad (2)$$

Therefore, the formulas (3), (4) hold, where FL1 is an oscillation frequency when Cv is Cv1 and FL2 is an oscillation frequency when Cv is Cv2.

$$FL1 = Fr \times [1 + \{(C1/2) \times 1/(C0+y1)\}] \quad (3)$$

where $y1 = 1/(1/Cv1 + 1/CL)$.

$$FL2 = Fr \times [1 + \{(C1/2) \times 1/(C0+y2)\}] \quad (4)$$

where $y2 = 1/(1/Cv2 + 1/CL)$.

Figure 5:
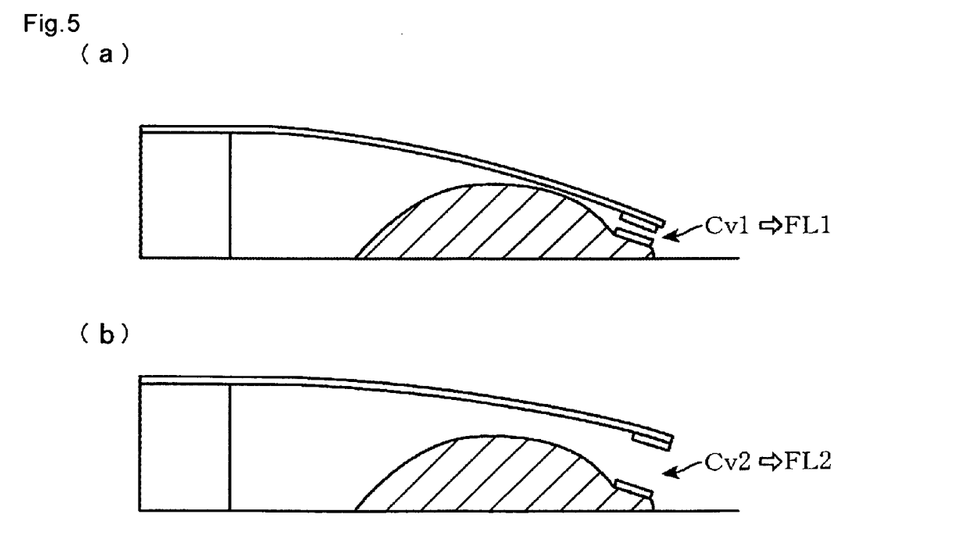
FIG. 5(a) and FIG. 5(b) are explanatory views showing how the quartz-crystal plate vibrates.
Figure 6:
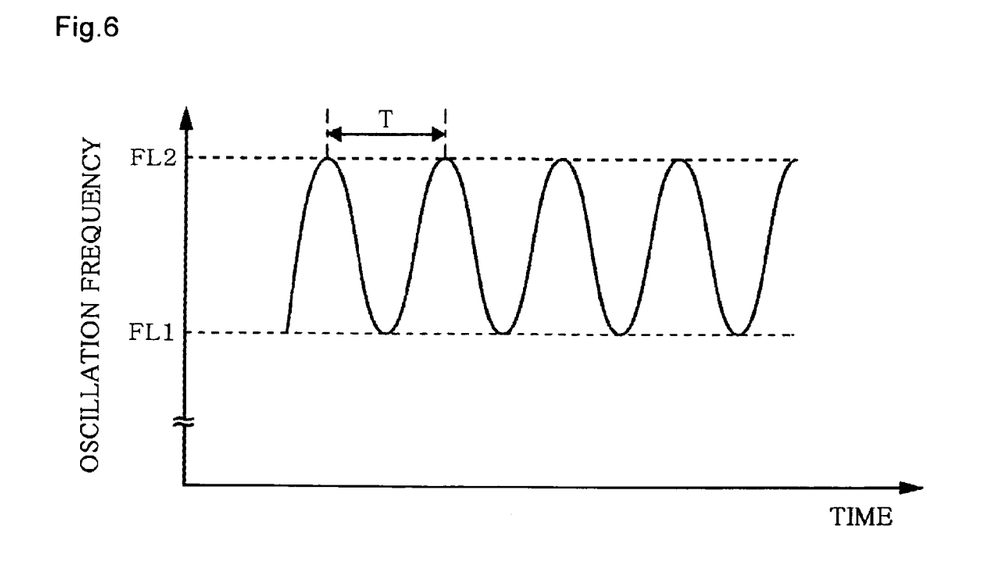
FIG. 6 is a frequency characteristic chart showing how an oscillation frequency changes due to vibration of the quartz-crystal plate.

The above vibration detecting device of the embodiment is installed so that, for example, the quartz-crystal plate 2 becomes horizontal, assuming that the quartz-crystal plate 2 is flat without bending when vibration is not applied thereto. When the vibration is applied to the vibration detecting device due to the occurrence of an earthquake, the quartz-crystal plate 2 vibrates, so that, for example, a first state shown in FIG. 5(a) and a second state shown in FIG. 5(b) are repeated. The frequencies FL1 and FL2 in the first state and the second state have values expressed by the formulas (3), (4) respectively, where values of Cv in the first state and the second state are Cv1 and Cv2 respectively, and therefore, the oscillation frequency changes between FL1 and FL2 with time as shown in FIG. 6. Therefore, by a data processing part 101 analyzing frequency data detected by a frequency detecting part 100, it is possible to find a period T (corresponding to a frequency) of a wave of the frequency change shown in FIG. 6.

When the vibration detecting device vibrates due to a seismic wave, acceleration is applied to the quartz-crystal plate 2 in one direction or in an opposite direction and the frequency data shown in, for example, FIG. 6 is obtained as previously described, and consequently, even the vibration with a low frequency of about 0.5 Hz can be accurately detected.

According to the above-described first embodiment, when the vibration is applied to the vessel 1, the quartz-crystal plate 2 supported in the cantilever manner in the vessel 1 bends due to an inertia force of the vibration, and the first state where the quartz-crystal plate 2 bends toward the fixed electrode 6 to approach the fixed electrode 6 and the second state where the quartz-crystal plate 2 is more apart from the fixed electrode 6 than in the first state alternately appear with the same period as that of the vibration. A change between these first state and second state can be regarded as a change in the variable capacitance, and by detecting the change in the variable capacitance as a change in the oscillation frequency of the quartz-crystal resonator, it is possible to find the period (frequency) of the vibration based on the change in the oscillation frequency.

Second Embodiment

Figure 7:
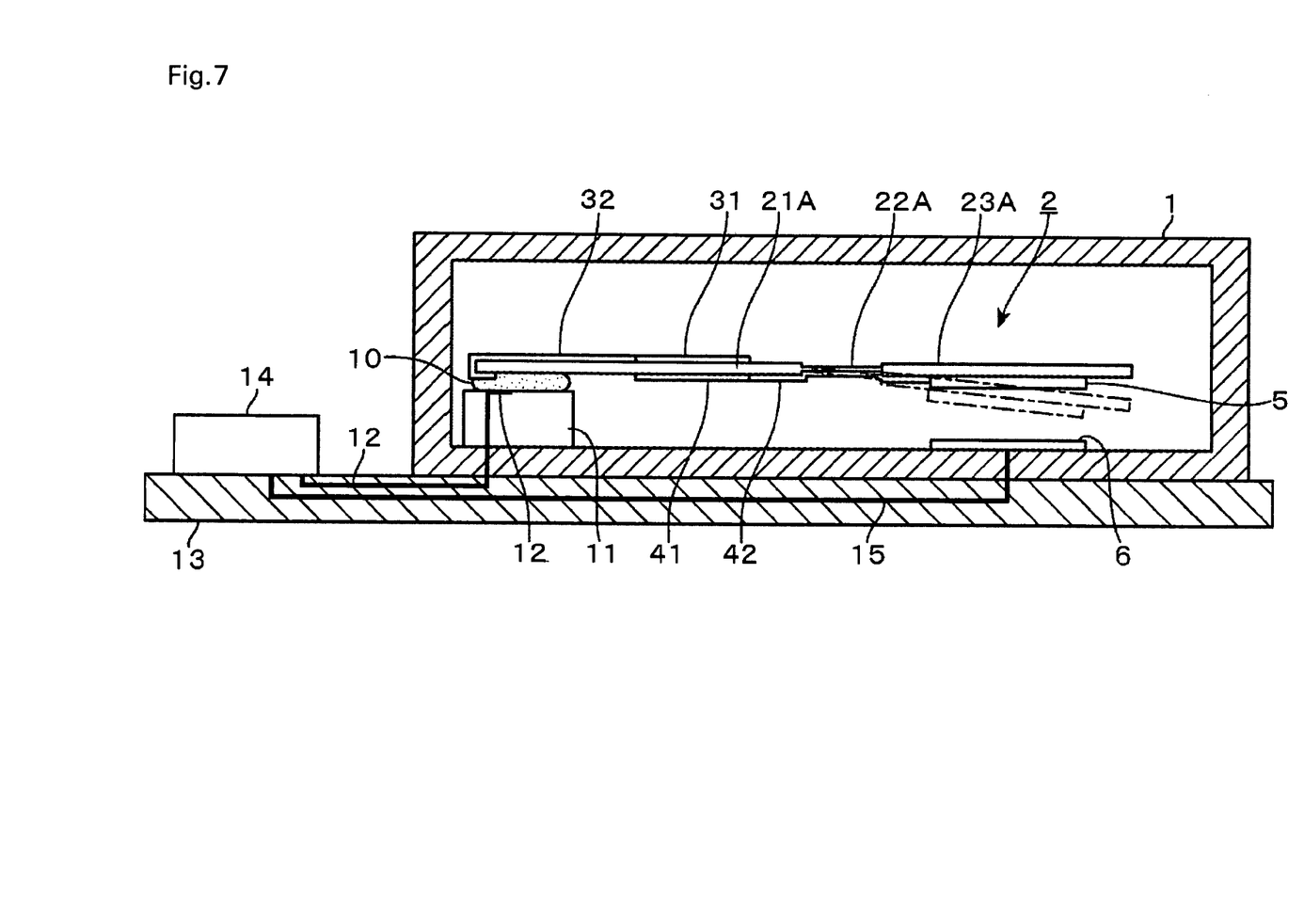
FIG. 7 is a vertical side sectional view showing a vibration detecting device according to a second embodiment of the present invention.

A second embodiment will be described with reference to FIG. 7. In this embodiment, the same structures as those of the first embodiment will be denoted by the same reference numerals and symbols and a description thereof will be omitted. The second embodiment is different from the first embodiment in the structure of its quartz-crystal plate 2. The quartz-crystal plate 2 is divided into three portions, that is, an electrode formation portion 21A, a thin portion 22A, and an enlarged portion 23A from one end side to the other end side, according to their functions, shapes, and so on, as shown in FIG. 7. First, the electrode formation portion 21A is located at one end side of the quartz-crystal plate 2, have excitation electrodes 31, 41 on its both surfaces, and practically plays a role corresponding to a quartz-crystal resonator. The thin portion 22A is smaller in thickness than the electrode formation portion 21A so as to easily bend, and the quartz-crystal plate 2 is designed so that this portion bends when an external force is applied. The enlarged portion 23A has a thickness set larger than those of the electrode formation portion 21A and the thin portion 22A and has a movable electrode 5 on its lower surface. Further, the enlarged portion 23A increases weight by having a large thickness and accordingly a bending amount becomes large when acceleration is applied, that is, it plays a role of a weight for improving sensitivity. Incidentally, a weight may be additionally provided on the enlarged portion 23A. In this case, the movable electrode 5 may serve also as the weight by having a larger thickness, the weight may be provided on the lower surface of the quartz-crystal plate 2 separately from the movable electrode 5, or the weight may be provided on the upper surface of the quartz-crystal plate 2.

According to the above-described second embodiment, the effect in the first embodiment is obtained, and in addition, in the quartz-crystal plate 2, the thin portion 22A is made smaller in thickness than the electrode formation portion 21A sandwiched by the excitation electrodes 31, 41, whereby the bending of the electrode formation portion 21A is reduced. As a result, a change in oscillation frequency due to the bending of the quartz-crystal plate 2, which becomes noise in external force detection, is reduced.

Further, the enlarged portion 23A increases the weight by having a larger thickness than that of the electrode formation portion 21A, so that the bending amount of the thin portion 22A, that is, an amplitude of the vibration of the enlarged portion 23A is increased for facilitating the detection of the acceleration of the vibration. Making the thickness of the electrode formation portion 21A large lowers the oscillation frequency, resulting in deterioration in detection accuracy, and therefore, there is a limit to increasing the thickness of the electrode formation portion 21A. In the enlarged portion 23A, the weight may be increased by the formation of a metal film thereon instead of the increase in its thickness, but this takes a lot of trouble. Therefore, the enlarged portion 23A desirably is larger in thickness than the electrode formation portion 21A. However, in the present invention, the thickness of the enlarged portion 23A may be equal to or smaller than the thickness of the electrode formation portion 21A. When the thickness of the enlarged portion 23A is smaller than the thickness of the electrode formation portion 21A, a relation between the bending amount and the external force may be adjusted by, for example, providing a thick metal film.

Even when the thin portion 22A is equal in thickness to the electrode formation portion 21A, if the enlarged portion 23A is larger in thickness than the electrode formation portion 21A, the bending amount of the quartz-crystal plate 2 increases as the inertia force of the vibration applied to the enlarged portion 23A increases, which can provide the effect of sensitivity improvement as described above.

Third Embodiment

A third embodiment of the present invention will be described with reference to FIG. 8. In the first embodiment, the quartz-crystal plate 2 serves both as a sensing lever forming the variable capacitance and as the quartz-crystal resonator, but this embodiment is different from the first embodiment in that these roles are assigned to separate members. In this embodiment, the same structures as those of the first embodiment will be denoted by the same reference numerals and symbols, and a description thereof will be omitted.

Figure 8:
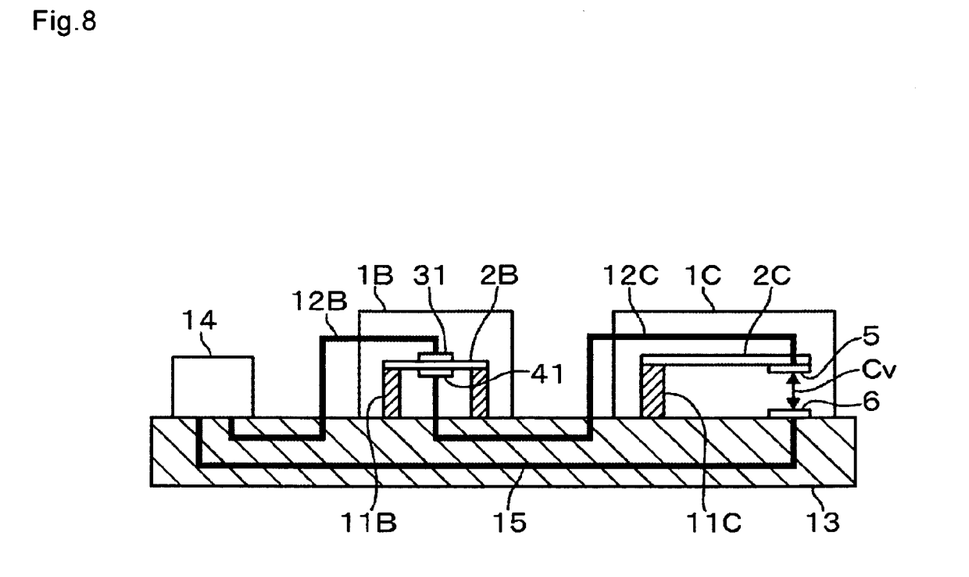
FIG. 8 is a vertical side sectional view showing a vibration detecting device according to a third embodiment of the present invention.

In a vibration detecting device of this embodiment, as shown in FIG. 8, a vessel 1B including therein a quartz-crystal resonator, a vessel 1C in which variable capacitance Cv is formed, and an oscillator circuit 14 are provided on an insulated substrate 13.

In the vessel 1B, a peripheral edge portion of a quartz-crystal plate 2B is supported via a pedestal 11B fixed to a bottom portion of the vessel 1B. On an upper surface and a lower surface of a center portion of the quartz-crystal plate 2B, excitation electrodes 31, 41 are provided respectively so as to face each other across the quartz-crystal plate 2B and form a quartz-crystal resonator. The excitation electrode 31 is connected to one end of the oscillator circuit 14 via a conductive path 12B composed a lead electrode 32 provided on the upper surface of the quartz-crystal plate 2B and a conductive path laid through the pedestal 11 and the insulated substrate 13.

In the vessel 1C, a base end portion (one end portion) of a plate-shaped member 2C is supported in a cantilever manner via a pedestal 11C fixed on a bottom portion of the vessel 1C, and a movable electrode 5 is provided on a lower surface of a tip portion (other end portion) of the plate-shaped member 2C. The movable electrode 5 is connected to the excitation electrode 41 in the vessel 1B via a conductive path 12C composed of lead electrodes 42, 42 provided on a front surface of the plate-shaped member 2C and a lower surface of the quartz-crystal plate 2B respectively and a conductive path laid through the pedestal 11C, the insulated substrate 13, and the pedestal 11B. On the bottom portion of the vessel 1C, a fixed electrode 6 is provided so as to face the movable electrode 5, and variable capacitance Cv is formed. This fixed electrode 6 is connected to one end of the oscillator circuit 14 via a conductive path 15 laid through the insulated substrate 13. As described above, in the vibration detecting device of this embodiment, the quartz-crystal resonator composed of the quartz-crystal plate 2B and the excitation electrodes 31, 41, the variable capacitance Cv formed by the movable electrode 5 and the fixed electrode 6, the oscillator circuit 14, and the conductive paths 12B, 12C, 15 form an oscillation loop.

When vibration is applied to this vibration detecting device, the plate-shaped member 2C bends, so that the variable capacitance Cv changes in accordance with a period of the vibration. By detecting the change in the variable capacitance Cv as a change in oscillation frequency of the quartz-crystal resonator, it is possible to measure the period of the vibration.

According to this embodiment, there are advantages that elastic coupling between the movable electrode 5 and the excitation electrode 41 can be avoided and a selection range in designing becomes wide because a member other than a piezoelectric body is usable as the plate-shaped member 2c.

Figure 9:
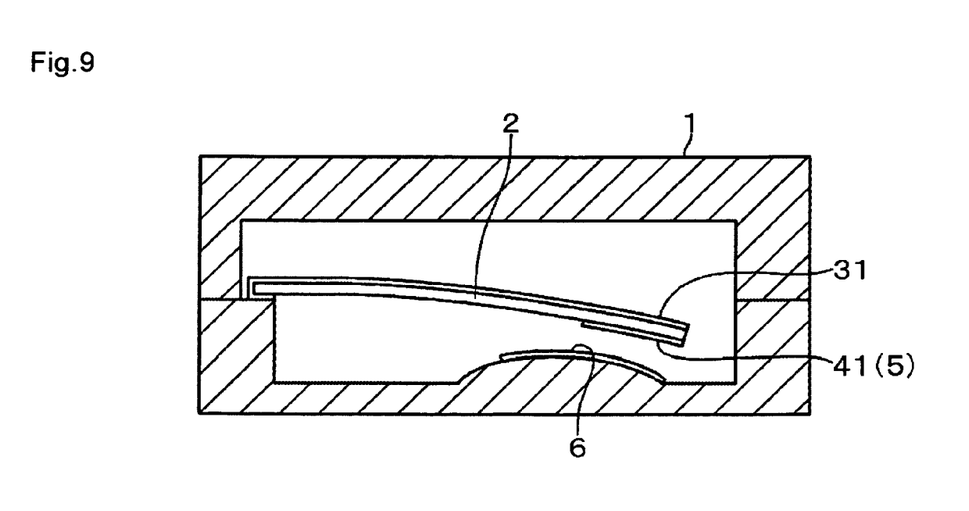
FIG. 9 is a vertical side sectional view showing a modification example of the present invention.
Figure 10:
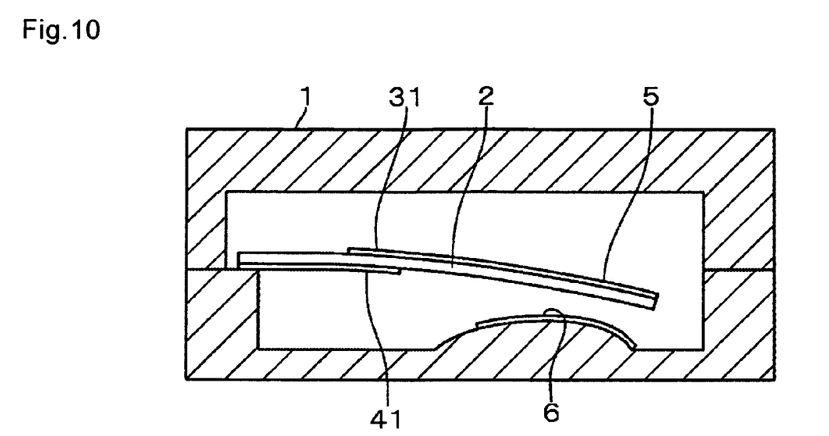
FIG. 10 is a vertical side sectional view showing a modification example of the present invention.

Modification examples of the present invention are shown in FIG. 9 and FIG. 10.

In a vibration sensor shown in FIG. 9, excitation electrodes 31, 41 of a quartz-crystal plate 2 are formed at a tip side of the quartz-crystal plate 2, and the excitation electrode 41 on a lower surface also serves as a movable electrode 5.

In a vibration sensor shown in FIG. 10, as a quartz-crystal resonator including a quartz-crystal plate 2, a structure where an upper surface and a lower surface of the quartz-crystal plate 2 are turned up side down is adopted. In this case, the quartz-crystal plate 2 is interposed between a movable electrode 5 and a fixed electrode 6, but this structure also provides the same operation and effect.

A vibration sensor shown in FIG. 10 has a structure where a movable electrode 5 on a lower surface of a quartz-crystal plate 2 is led up to an upper surface, and a fixed electrode 6 is provided on an upper surface of an inner wall of an inner space of a vessel 1 so as to face the movable electrode 5. In this case as well, the same operation and effect can be obtained.

Figure 11:
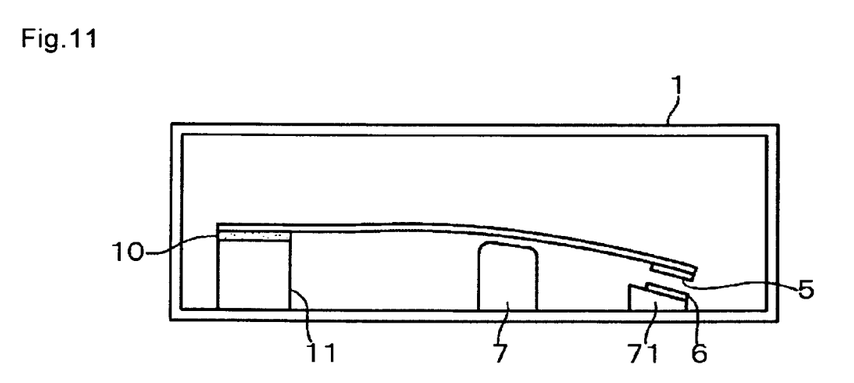
FIG. 11 is a vertical side sectional view showing a modification example of the present invention.

In order to prevent the tip of the quartz-crystal plate 2 from colliding with the vessel 1, the structure shown in FIG. 11 may be adopted. In this example, at a position deviated from a movable electrode 5 toward a base end portion of a quartz-crystal plate 2, a projection 7 having a quadrangular shape equal in width as the quartz-crystal plate 2 in a plane view but having a curved upper surface in a side view so as to correspond to a bent shape that the quartz-crystal plate 2 has when a force is applied thereto is provided. Further, a fixed electrode 6 is provided on a pedestal 71 separated from the projection 7.

Figure 12:
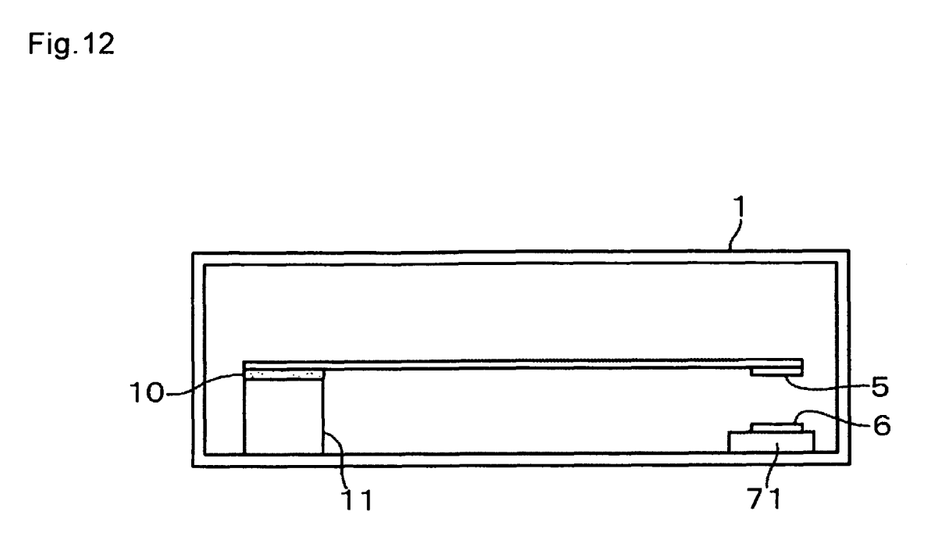
FIG. 12 is a vertical side sectional view showing a modification example of the present invention.

Further, the present invention preferably has the structure where the projection 7 is provided, but may have a structure where the projection 7 is not provided as shown in FIG. 12. Note that the excitation electrodes and so on are omitted in FIG. 11 and FIG. 12.

The present invention described above is also applicable to the detection of a period not only of earthquake vibration but also of simulated vibration. Further, the present invention may be applied to, for example, the detection of a period of vibration occurring in a washing machine main body due to a spinning water current containing washed articles or the like when a washing machine is operating.

What is claimed is:

1. A vibration detecting device detecting a period of vibration of an object and an external force, comprising:
    a piezoelectric plate;
    a first excitation electrode and a second excitation electrode provided on one surface and another surface of the piezoelectric plate respectively to vibrate the piezoelectric plate;
    an oscillator circuit electrically connected to the first excitation electrode;
    a plate-shaped member provided in a vessel and having one end supported in a cantilever manner;
    a movable electrode for variable capacitance formation provided at another end of the plate-shaped member and electrically connected to the is second excitation electrode;
    a fixed electrode provided in the vessel to face the movable electrode, connected to the oscillator circuit, and forming variable capacitance when capacitance between the fixed electrode and the movable electrode is varied due to bending of the plate-shaped member; and
    a frequency information detecting part detecting a signal being frequency information corresponding to an oscillation frequency of the oscillator circuit,
    wherein an oscillation loop is formed from the oscillator circuit back to the oscillator circuit through the first excitation electrode, the second excitation electrode, the movable electrode, and the fixed electrode, and
    wherein vibration of the vessel produces a first state where the plate-shaped member bends toward the fixed electrode to approach the fixed electrode and a second state where the plate-shaped member is more apart from the fixed electrode than in the first state, and the frequency information is used for finding a period of the vibration by utilizing a fact that an oscillation frequency corresponding to the first state and an oscillation frequency corresponding to the second state alternately appear.

2. The vibration detecting device according to claim 1, wherein the plate-shaped member also serves as the piezoelectric plate.

3. The vibration detecting device according to claim 1, wherein, in the plate-shaped member, a portion where the movable electrode is provided is larger in thickness than a portion sandwiched by the first excitation electrode and the second excitation electrode.

4. The vibration detecting device according to claim 1, wherein, in the plate-shaped member, a portion between a portion that the first excitation electrode and the second excitation electrode sandwich and the movable electrode is smaller in thickness than the sandwiched portion.

5. The vibration detecting device according to claim 1, further comprising
    on an internal wall part on a side where the fixed electrode is provided in the container, a projecting part allowing a contact of a portion shifted toward one end side from the other end side of the plate-shaped member to restrict bending of this portion when the plate-shaped member bends excessively, thereby avoiding collision of the other end of the plate-shaped member with the inner wall part of the container.

6. The vibration detecting device according to claim 5, wherein
    with respect to a face of the projecting part which faces the plate-shaped member, a vertical cross-sectional shape in a length direction of the piezoelectric piece is a mound shape.

* * * * *

UNITED STATES PATENT AND TRADEMARK OFFICE
CERTIFICATE OF CORRECTION

PATENT NO.      : 8,677,828 B2                                    Page 1 of 1
APPLICATION NO. : 13/374627
DATED           : March 25, 2014
INVENTOR(S)     : Mitsuaki Koyama et al.

It is certified that error appears in the above-identified patent and that said Letters Patent is hereby corrected as shown below:

In the Claims:

At col. 7, lines 44-45 please change "electrically connected to the is second excitation electrode;" to --electrically connected to the second excitation electrode;--.

Signed and Sealed this
Twelfth Day of August, 2014

Michelle K. Lee
*Deputy Director of the United States Patent and Trademark Office*